T. & E. KAVALAS.
WIRE FENCE MACHINE.
APPLICATION FILED DEC. 6, 1916.
1,227,272.
Patented May 22, 1917.
2 SHEETS—SHEET 2.
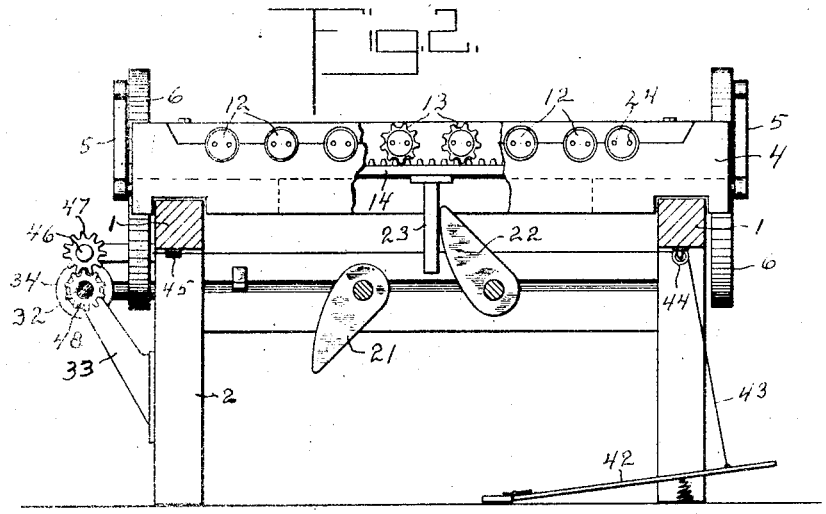
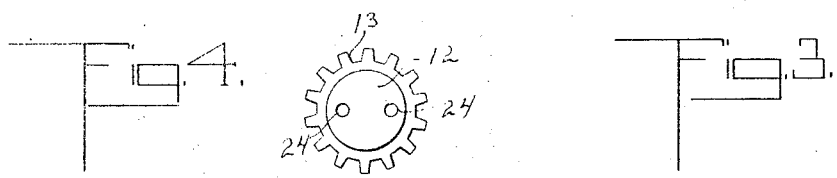
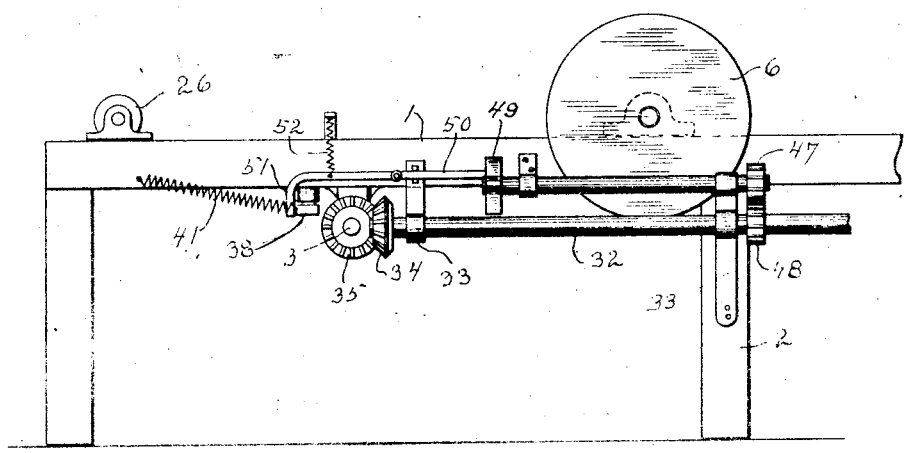

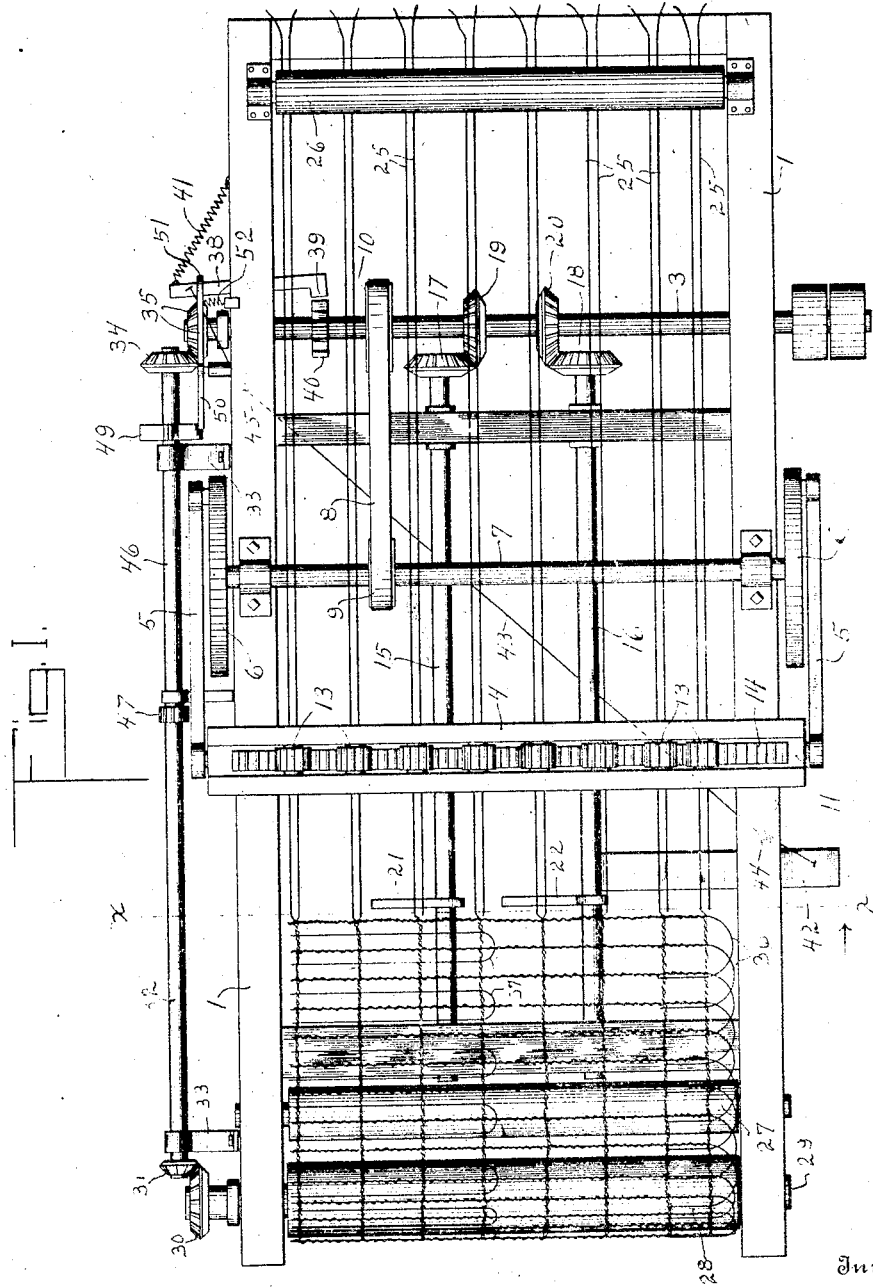

UNITED STATES PATENT OFFICE.

TOM KAVALAS AND EVANS KAVALAS, OF ROCK FALLS, ILLINOIS.

WIRE-FENCE MACHINE.

1,227,272.      Specification of Letters Patent.      Patented May 22, 1917.

Application filed December 6, 1916. Serial No. 135,315.

*To all whom it may concern:*

Be it known that we, TOM KAVALAS and EVANS KAVALAS, subjects of Constantine I, King of Greece, residing at Rock Falls, in the county of Whiteside and State of Illinois, have invented certain new and useful Improvements in Wire-Fence Machines, of which the following is a specification.

Our invention has reference to wire fence machines, and is more specially designed for the construction of ornamental fencing, such as is used to inclose a lawn or garden.

The construction, arrangement and operation of the various parts of our machine will more fully appear from the following specification, reference being had to the accompanying drawings, in which:

Figure 1 is a plan view of our invention. Fig. 2 is a cross-section on the broken line *x—x* of Fig. 1. Fig. 3 shows one end of the machine, in side elevation. Fig. 4 is an enlarged detail of one of the spindles 12.

1 represents the frame of the machine, mounted on legs 2, and 3 is a main drive shaft rotatably supported from the side-pieces of the frame. A cross-beam 4 is slidingly mounted on the side pieces of the frame 1, movement being imparted thereto by means of a pair of crank-arms 5, connecting the ends of said cross-beam with a pair of crank-wheels 6, on a shaft 7, journaled on the frame 1. Movement is imparted to the shaft 7 from the shaft 3 by means of a belt 8, connecting a pulley 9 on the shaft 7 with a pulley 10 on the shaft 3.

The beam 4 has a longitudinal channel 11, in which is rotatably mounted a series of spindles 12, provided centrally with pinions 13, adapted to be operated by a rack 14, slidable in the channel 11. A pair of shafts 15 and 16 are supported longitudinally of the machine, such shafts having fixed thereto at one end gear-wheels 17 and 18, in mesh with oppositely disposed gear-wheels 19 and 20 on the shaft 3, whereby the shafts 15 and 16 are capable of being rotated in opposite directions. Fixed on the shafts 15 and 16 are cams 21 and 22, which alternately engage an arm 23 projecting downwardly from the rack 14, imparting to such rack a reciprocating movement.

Each of the spindles 12 is provided with a pair of perforations 24, through which are directed a pair of wires 25, such wires entering the machine at one end between a pair of rollers 26 (one only being shown), and thence pass through the spindles 12, over a roller 27, and to a drum 28, upon which they are wound after having been provided with the cross-wires or pickets. The drum 28 is mounted on a shaft 29 supported from the frame 1, and provided at one end with a bevel-gear wheel 30, actuated by a bevel-gear wheel 31 on the end of a shaft 32, supported in bearings 33 fixed to the frame 1. The opposite end of the shaft 32 has fixed thereon a bevel-gear wheel 34, driven by a similar wheel 35 on the end of the shaft 3. Movement is thus imparted from the shaft 3 to the drum 28, to suitably rotate the same.

The cams 21 and 22 are located so as to engage the arm 23 when the cross-beam 4 is at the end of its outer movement, and the rack 14 is thereby moved in one direction or the other, to give to the wires 25 the desired amount of twist. Just prior to the movement of such rack one of the pickets 36 or 37 is placed in position between the several pairs of wires, the rotation of the spindles 12 operating to coil the wires adjacent to the pickets and hold the same tightly in place. When the next succeeding picket is placed in position the wires 25 are twisted in the opposite direction, the wires being thus alternately twisted to the right and left.

When the picket is being inserted it is necessary that the machine be stationary. To accomplish this, a lever 38 is fulcrumed on the frame 1 and provided at its inner end with a brake 39, which is adapted to engage a ratchet wheel 40 on the shaft 3, and hold such shaft from movement. Such brake is held normally in engagement with said wheel by means of a coiled spring 41 connecting the outer end of the lever 38 with the frame 1. At one side of the machine near the point where the operator stands, is a foot-lever 42, connected with the outer end of the lever 38 by means of a cord 43, passing over rollers 44 and 45 on the frame. When the operator has inserted one of the pickets he presses the lever 42 downwardly, disengaging the brake 39, and permitting the mechanism to operate. In order that this may be accomplished the shaft 3 must possess a slow movement and low power.

Above the shaft 32 is rotatably mounted a shaft 46, provided at one end with a gear-wheel 47 in mesh with and actuated by a similar wheel 48 on the shaft 32. At its opposite end the shaft 46 has fixed thereto a spur-wheel 49, the spurs of which are capable of successively engaging one end of a lever 50, fulcrumed on the frame 1 and provided at its opposite end with a hook 51, which is adapted to engage the lever 38, after the brake is disengaged, and hold the same from being reëngaged with the wheel 40 during the operation of the spindles 12. Upon the continued rotation of the spur wheel 49 the end of the lever slips past the spur with which it is engaged, and the hook being pulled up by the spring 52, the brake is again permitted to operate, stopping the machine for the insertion of the next picket.

The complete operation of the machine is as follows: Each of the spindles 12 being provided with a pair of the wires 25 and the ends of such wires being suitably secured to the drum 28, the operator, who stands at the side of the machine convenient to the foot-lever 42, inserts a picket between the several pairs of wires. At this time the spindles are disposed with the wires in vertical alinement, for convenience in inserting the picket between the same. The lever 42 is then operated to release the brake mechanism and start the machine, whereupon the spindles are simultaneously rotated in the same direction, resulting in each pair of wires 25 being provided with two or three twists between the picket and spindles. At the same time the beam 4 moves in the direction of the picket, forcing the twists tightly together at a point adjacent thereto. Coincident with this movement the shaft 32 is given a partial rotation, which is imparted to the drum 28, causing the wires to be drawn in the direction of the drum. When such wires have been moved a distance equaling the space between two of the pickets one of the spurs of the wheel 49 disengages the lever 50, permitting the brake mechanism to operate, and stopping the movement of the machine. Prior to the stoppage of the machine the beam 4 is returned to its former position, with the wires ready to receive another picket. In each operation of the machine the direction of rotation of the spindles is reversed, so that the wires are twisted in contrary directions on opposite sides of each of the pickets.

What we claim as our invention, and desire to secure by Letters Patent of the United States, is:

1. A device of the class described, comprising a frame, a cross-beam slidably mounted thereon; a plurality of spindles rotatably supported by said cross-beam and each provided with perforations for the passage of a pair of wires; gear-pinions fixed to said spindles; a gear-rack slidably mounted in said cross-beam, in mesh with said spindles; means for imparting to said cross-beam a reciprocating movement; and means for suitably operating said gear-rack.

2. A device of the class described, comprising a suitably mounted frame; mechanism for conveying a plurality of wires longitudinally therethrough; a cross-beam slidably mounted on said frame, and provided with a longitudinal channel; a plurality of spindles mounted in said channel, having perforations for the passage of said wires in pairs; gear-pinions fixed on said spindles; a rack-bar slidable longitudinally of said cross-beam, and adapted to actuate said spindles; means for suitably operating said rack-bar; and means for imparting a reciprocating movement to said cross-beam.

3. A device of the class described, comprising a suitably mounted frame; a main drive-shaft mounted therein; a drum rotatably mounted in one end of said frame, and adapted to draw a plurality of wires therethrough; gearing operatively connecting said drum with said drive-shaft; a cross-beam slidably mounted on said frame and provided with a longitudinal channel; a cross-shaft journaled on said frame and actuated by said drive-shaft; crank-wheels on the end of said cross-shaft operatively connected with said cross-beam, to impart a reciprocating movement thereto; wire-twisting mechanism carried by said cross-beam; and means for suitably actuating said mechanism.

4. A device of the class described, comprising a suitably mounted frame; a main drive-shaft mounted therein; wire-conveying mechanism operatively connected with said drive-shaft; a cross-beam slidably mounted on said frame and provided with a longitudinal channel; a cross-shaft journaled on said frame and actuated by said drive-shaft; crank-wheels on the ends of said cross-shaft operatively connected with the ends of said cross-beam to give a reciprocating movement thereto; a plurality of spindles mounted in said channel, each adapted for the passage of a pair of wires; gear-pinions on said spindles; a rack-bar in engagement with said pinions; means for suitably actuating said rack-bar; and means for interrupting the movement of said drive-shaft.

5. A device of the class described, comprising a suitably mounted frame; a main drive-shaft mounted therein; wire conveying devices operatively connected with said drive-shaft; a cross-beam slidably mounted on said frame and provided with a longitudinal channel; a plurality of spindles mounted in said channel, adapted each for the passage of a pair of wires; gear-pinions on said spindles; a rack-bar in engagement with said pinions; means for reciprocating said cross-beam upon the rotation of said drive-shaft; means for suitably operating said rack-bar; a brake-wheel fixed on said drive-shaft; a brake-lever fulcrumed on said frame and provided with brake-devices normally in engagement with said brake-wheel; a foot-lever operatively connected with said brake-lever; and auxiliary means for holding said brake-lever out of engagement with said brake, operatively releasable from the movement of the driving mechanism.

6. A device of the class described, comprising a suitably mounted frame; a main drive-shaft mounted therein; a cross-beam slidably mounted on said frame; a cross-shaft actuated by said drive-shaft; crank-wheels on the ends of said shaft, operatively connected with said cross-beam; wire twisting devices carried by said cross-beam; means for suitably operating said twisting devices; a brake-wheel fixed on said drive-shaft; a brake lever fulcrumed on said frame and normally in engagement with said brake-wheel; a shaft mounted on said frame and operatively connected with said drive-shaft; a spur-wheel fixed on said last-named shaft; a hook-lever fulcrumed on said frame, operable at one of its ends by said spur-wheel, and adapted to engage said brake-lever at its opposite end; and means for actuating said brake-lever with the foot of the operator.

7. A device of the class described, comprising a suitably mounted frame; a main drive-shaft mounted therein; wire conveying devices operatively connected with said drive-shaft; a cross-beam slidable on said frame and provided with a longitudinal channel; a plurality of spindles mounted in said channel; gear-pinions fixed on said spindles; a rack-bar in engagement with said pinions and provided with a downwardy projecting arm; a pair of longitudinal shafts operatively connected with said drive-shaft so as to turn in opposite directions; means for suitably reciprocating said cross-beam; and a pair of cams on said longitudinal shafts adapted to alternately engage the arm of said rack-bar when said cross-beam is at the end of its outer movement.

In testimony whereof we affix our signatures in presence of two witnesses.

TOM KAVALAS.
EVANS KAVALAS.

Witnesses:
  W. N. HASKELL,
  FRANK W. HASKELL.